United States Patent
Park

(10) Patent No.: US 10,496,879 B2
(45) Date of Patent: Dec. 3, 2019

(54) MULTIPLE-DETECTION GESTURE RECOGNITION

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 222 days.

(21) Appl. No.: 15/687,432

(22) Filed: Aug. 25, 2017

(65) Prior Publication Data

US 2019/0065836 A1 Feb. 28, 2019

(51) Int. Cl.
*G06K 9/00* (2006.01)
*G06T 7/246* (2017.01)
*H04L 12/28* (2006.01)

(52) U.S. Cl.
CPC .......... *G06K 9/00355* (2013.01); *G06T 7/251* (2017.01); *H04L 12/282* (2013.01)

(58) Field of Classification Search
CPC ...... G06K 9/00355; G06F 3/01; H04L 12/282
See application file for complete search history.

(56) References Cited

U.S. PATENT DOCUMENTS

| | | | |
|---|---|---|---|
| 9,632,658 B2* | 4/2017 | Holz | G06F 3/017 |
| 9,857,881 B2* | 1/2018 | Karmon | G06F 3/0304 |
| 10,380,429 B2* | 8/2019 | Chaudhry | |
| 2015/0220775 A1 | 8/2015 | Nguyen et al. | |
| 2015/0331492 A1 | 11/2015 | Woo et al. | |
| 2016/0078289 A1* | 3/2016 | Michel | G06T 7/73 345/156 |
| 2016/0188109 A1 | 6/2016 | Wang et al. | |
| 2017/0064211 A1 | 3/2017 | Omid-Zohoor | |
| 2019/0065836 A1* | 2/2019 | Park | G06K 9/00355 |

FOREIGN PATENT DOCUMENTS

| | | |
|---|---|---|
| CN | 104992171 A | 10/2015 |
| TW | 201506684 A | 2/2015 |

* cited by examiner

*Primary Examiner* — Gregory M Desire
(74) *Attorney, Agent, or Firm* — Holland & Hart LLP-CLX; Robert A. Reid

(57) ABSTRACT

Systems and methods are disclosed for recognizing a multi-component gesture within a sequence of image frames. A method comprises selecting a first object model as the selected object model, wherein the first object model corresponds to a first component of the multi-component gesture, receiving a frame in the sequence of frames and analyzing the frame to determine whether the frame includes a first object that matches the selected first object model, selecting a second object model as the selected object model, wherein the second object model corresponds to a second component of the multi-component gesture, receiving at least one subsequent frame and analyzing the at least one subsequent frame to determine whether the at least one subsequent frame includes a second object that matches the selected second object model, and recognizing that the multi-component gesture is present in the sequence of image frames.

30 Claims, 11 Drawing Sheets

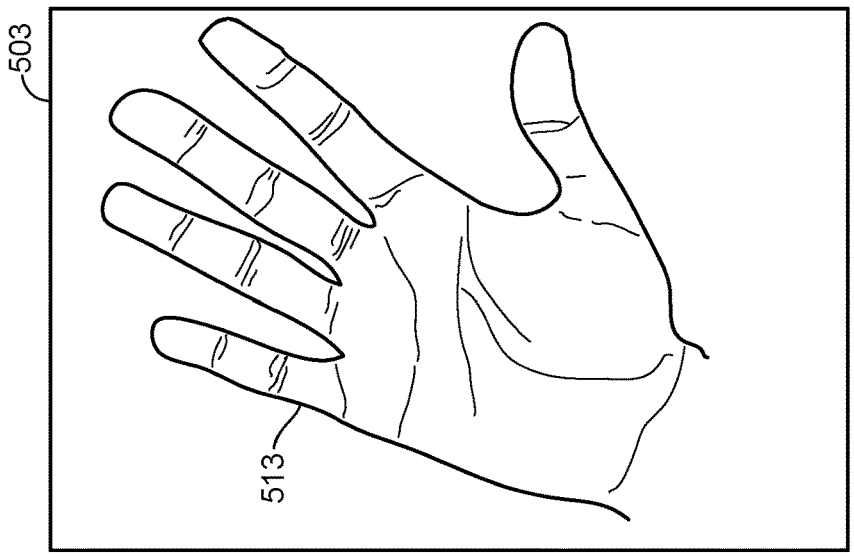
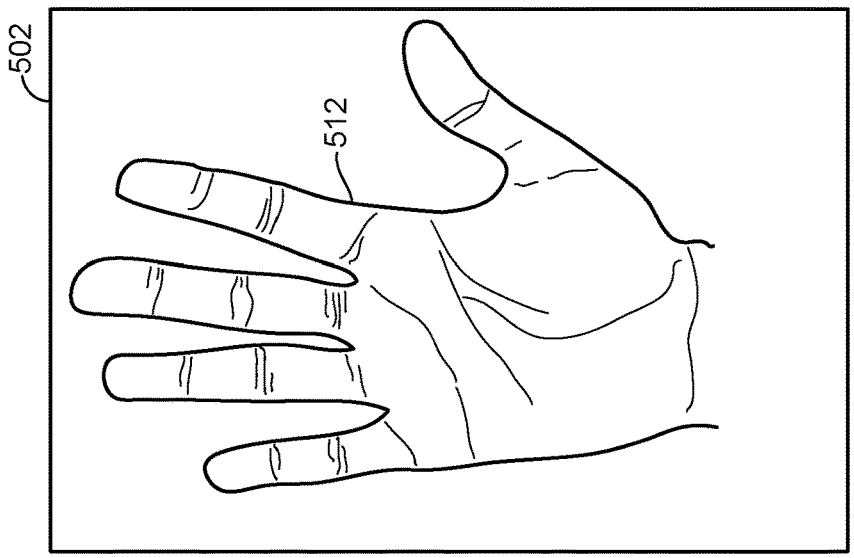
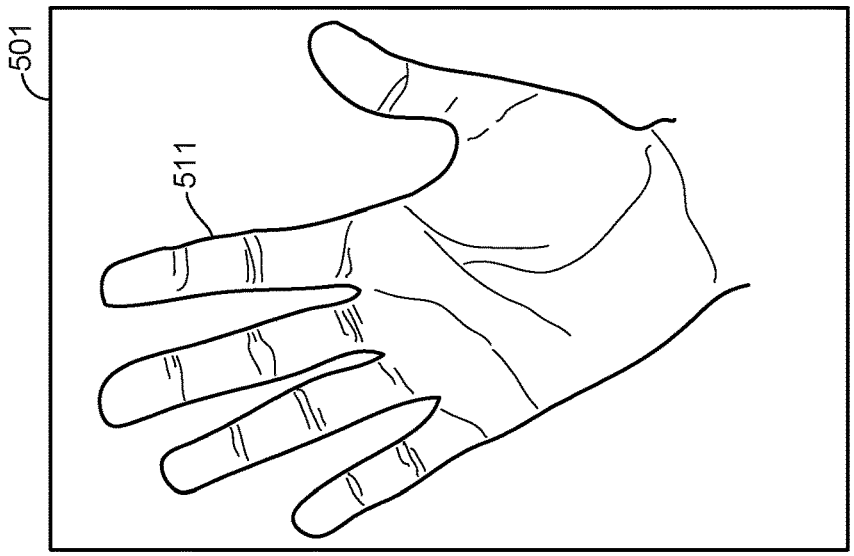
FIG. 5

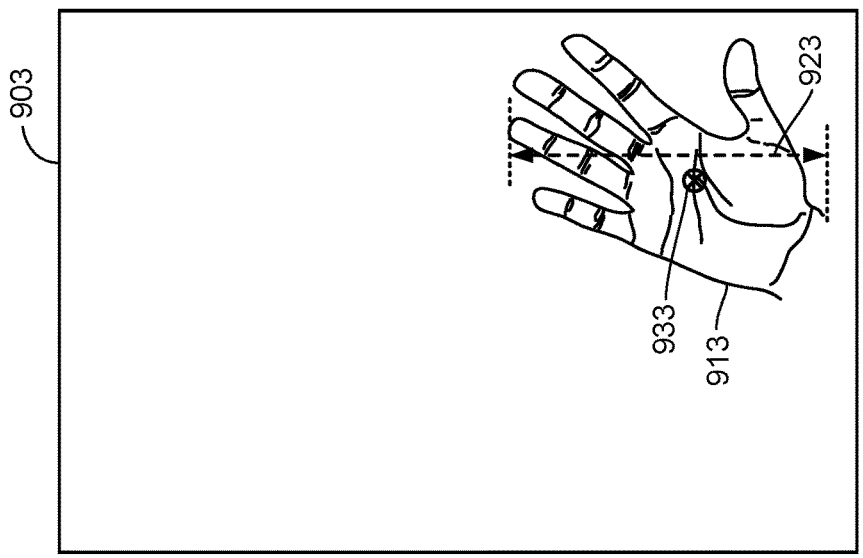
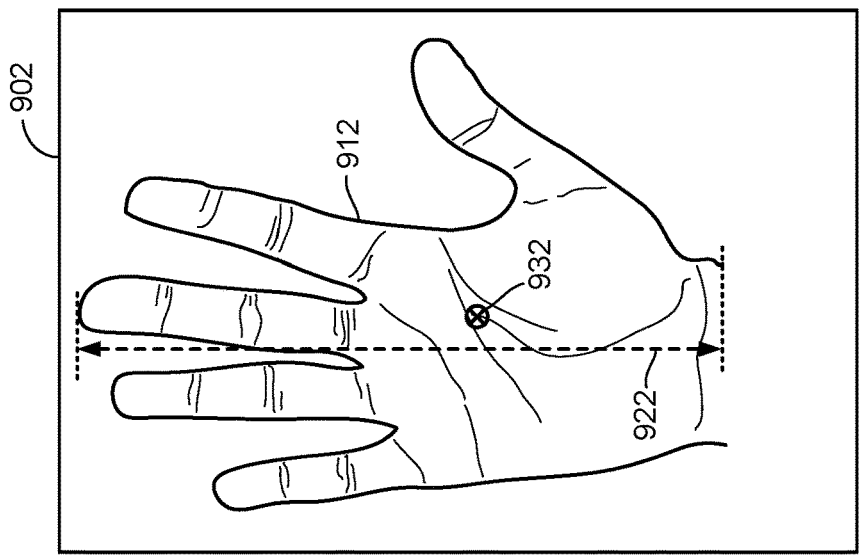
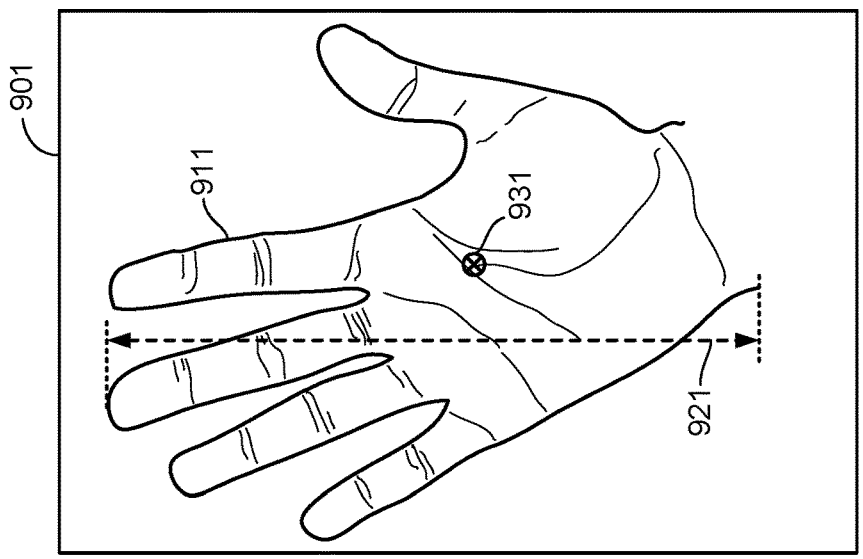
FIG. 9

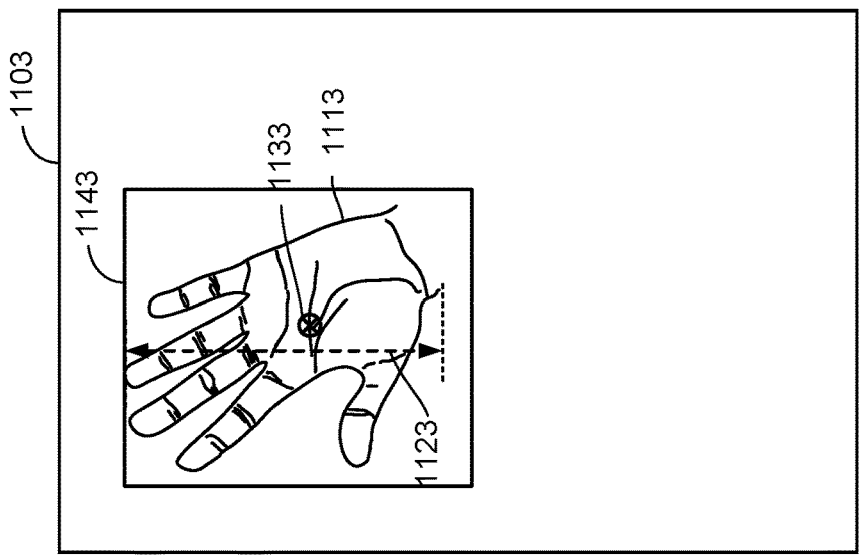
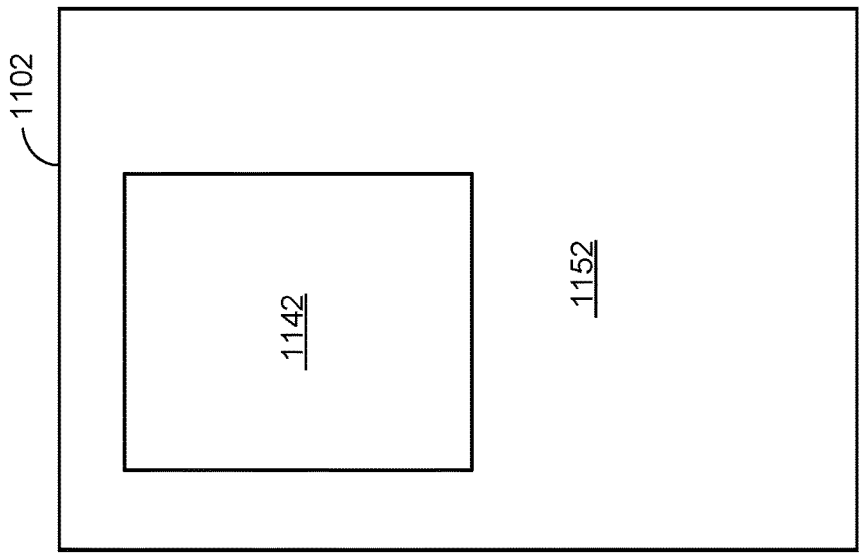
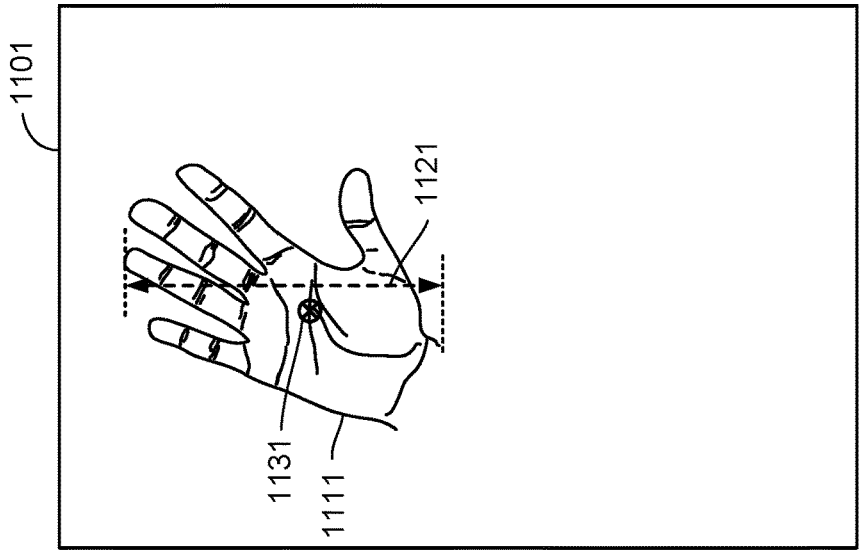
FIG. 11

US 10,496,879 B2

MULTIPLE-DETECTION GESTURE RECOGNITION

BACKGROUND

Aspects of this disclosure relate generally to telecommunications, and more particularly to interactions between user equipment and other devices in a shared wireless access environment.

The Internet is a global system of interconnected computers and computer networks that use a standard Internet protocol suite (e.g., the Transmission Control Protocol (TCP) and Internet Protocol (IP)) to communicate with each other. The Internet of Things (IoT), sometimes referred to as the Internet of Everything (IoE), is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services, wherein doctors can, for example, remotely monitor patients' health while people can track the progress of fitness routines. A technological revolution in the home is driving development for new "smart" services, wherein smart homes and buildings can have some level of centralized control over virtually any device or system in the home or office, for example, appliances, toys, robotic vacuum cleaners, radio, and plug-in electric vehicle (PEV) security systems. Buildings are getting smarter and more convenient as a means to reduce operational costs for enterprise facilities. In the field of asset tracking, enterprises, hospitals, factories, and other large organizations can accurately track the locations of high-value equipment, patients, vehicles, and so on.

As such, in the near future, increasing development in IoT systems will lead to numerous IoT devices surrounding a user at home, in vehicles, at work, and many other locations. Accordingly, a need exists for an IoT management device that leverages large amounts of disorganized data in useful ways.

SUMMARY

The following summary is an overview provided solely to aid in the description of various aspects of the disclosure and is provided solely for illustration of the aspects and not limitation thereof.

In one example, a method for recognizing a multi-component gesture within a sequence of image frame is disclosed. The method may include, for example, selecting a first object model as the selected object model, wherein the first object model corresponds to a first component of the multi-component gesture, receiving a frame in the sequence of frames and analyzing the frame to determine whether the frame includes a first object that matches the selected first object model, in response to a determination that the frame includes the first object that matches the selected first object model, selecting a second object model as the selected object model, wherein the second object model corresponds to a second component of the multi-component gesture, receiving at least one subsequent frame and analyzing the at least one subsequent frame to determine whether the at least one subsequent frame includes a second object that matches the selected second object model, and in response to a determination that the at least one subsequent frame includes a second object that matches the selected second object model, recognizing that the multi-component gesture is present in the sequence of image frames.

In another example, an apparatus configured to recognize a multi-component gesture within a sequence of image frames is disclosed. The apparatus may include, for example, a memory system, to store related data and instructions, and a processing system coupled to the memory system. The processing system may be configured to select a first object model as the selected object model, wherein the first object model corresponds to a first component of the multi-component gesture, receive a frame in the sequence of frames and analyzing the frame to determine whether the frame includes a first object that matches the selected first object model, in response to a determination that the frame includes the first object that matches the selected first object model, select a second object model as the selected object model, wherein the second object model corresponds to a second component of the multi-component gesture, receive at least one subsequent frame and analyze the at least one subsequent frame to determine whether the at least one subsequent frame includes a second object that matches the selected second object model, and in response to a determination that the at least one subsequent frame includes a second object that matches the selected second object model, recognizing that the multi-component gesture is present in the sequence of image frames.

In yet another example, another apparatus configured to recognize a multi-component gesture within a sequence of image frames is disclosed. The apparatus may include, for example, means for selecting a first object model as the selected object model, wherein the first object model corresponds to a first component of the multi-component gesture, means for receiving a frame in the sequence of frames and analyzing the frame to determine whether the frame includes a first object that matches the selected first object model, means for selecting a second object model as the selected object model, wherein the second object model corresponds to a second component of the multi-component gesture, in response to a determination that the frame includes the first object that matches the selected first object model, means for receiving at least one subsequent frame and analyzing the at least one subsequent frame to determine whether the at least one subsequent frame includes a second object that matches the selected second object model, and means for recognizing that the multi-component gesture is present in the sequence of image frames in response to a determination that the at least one subsequent frame includes a second object that matches the selected second object model.

In yet another example, a non-transitory computer-readable medium is disclosed. The non-transitory computer-readable medium may comprise code, which, when executed by a processor, causes the processor to perform operations for recognizing a multi-component gesture within a sequence of image frames. The non-transitory computer-readable medium may include, for example, code for selecting a first object model as the selected object model, wherein the first object model corresponds to a first component of the multi-component gesture, code for receiving a frame in the sequence of frames and analyzing the frame to determine whether the frame includes a first object that matches the selected first object model, code for selecting a second object model as the selected object model, wherein the second object model corresponds to a second component of the multi-component gesture, in response to a determination that the frame includes the first object that matches the selected first object model, code for receiving at least one subsequent frame and analyzing the at least one subsequent frame to determine whether the at least one subsequent frame includes a second object that matches the selected second object model, and code for recognizing that the multi-component gesture is present in the sequence of image frames in response to a determination that the at least one subsequent frame includes a second object that matches the selected second object model.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 5 generally illustrates a multi-component gesture captured within several distinct image frames.

FIG. 9 generally illustrates a partial multi-component gesture captured within several distinct image frames.

FIG. 11 generally illustrates another partial multi-component gesture captured within several distinct image frames.

DETAILED DESCRIPTION

An IoT system within, for example, a smart home, may be pre-programmed to perform one or more IoT functions using one or more IoT devices. Each performance of an IoT function may be triggered, as per the programming, by one or more contextual conditions identified by the IoT system. The contextual conditions may be identified using data downloaded from a network and/or data sensed directly using an IoT sensor associated with the IoT system. The IoT system may misbehave by, for example, performing a function that a user of the IoT system disapproves of, performing the function at a wrong time, performing the function in response to the wrong set of contextual conditions, etc.

It may be useful to incorporate into the IoT system some algorithm for training and/or reconfiguring the IoT system. The IoT system may learn, based on feedback from a user, whether the user approves or disapproves of the particular function and/or decision to perform the function. Accordingly, it may be useful to provide many different mechanisms for providing feedback.

Figure 1:
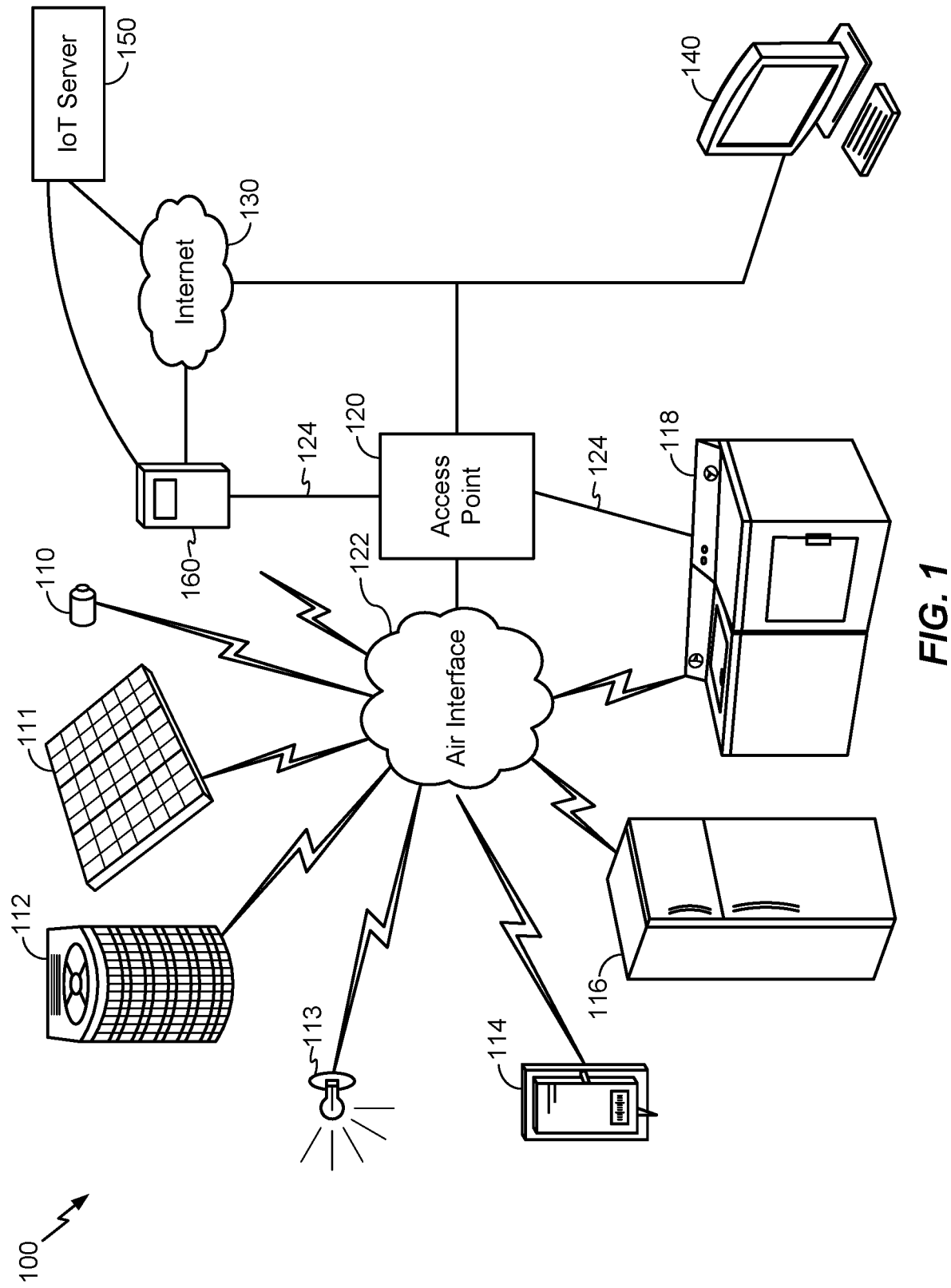
FIG. 1 illustrates a high-level system architecture of a wireless communications system in accordance with an aspect of the disclosure.
Figure 2:
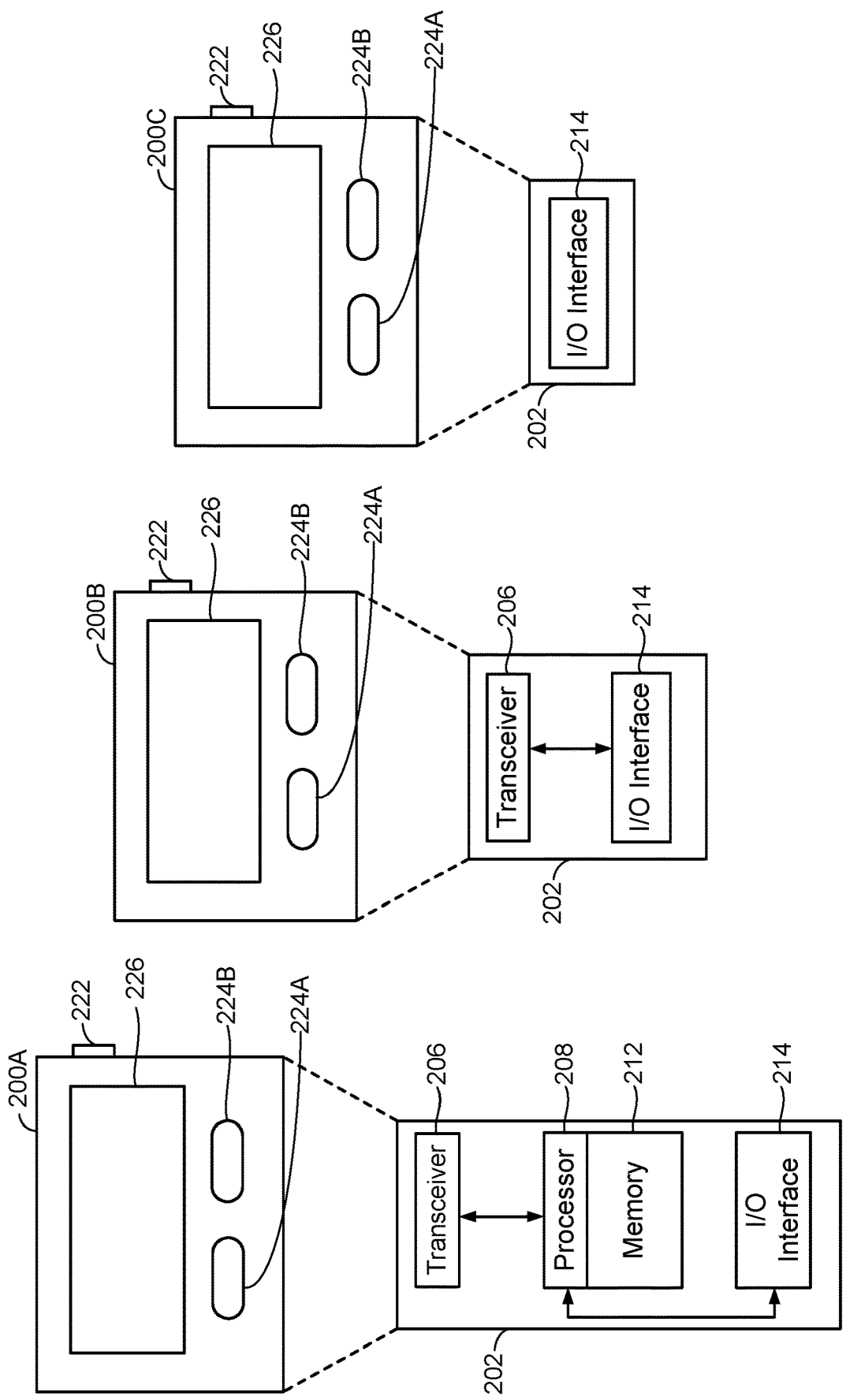
FIG. 2A illustrates an exemplary IoT device in accordance with aspects of the disclosure.
FIG. 2B illustrates an exemplary passive IoT device in accordance with aspects of the disclosure.
FIG. 2C illustrates another exemplary passive IoT device in accordance with aspects of the disclosure.
Figure 3:
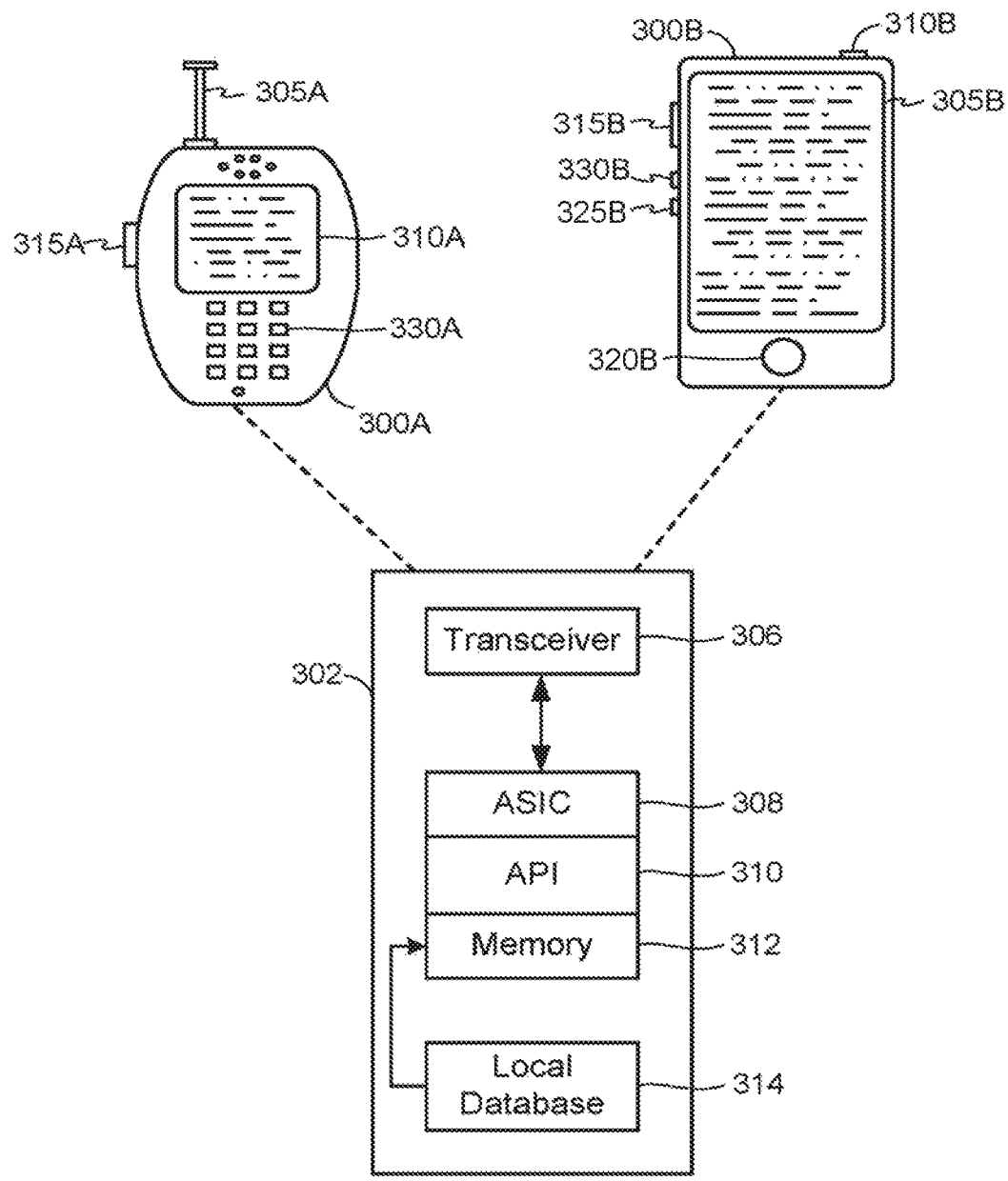
FIG. 3 illustrates examples of user equipments (UEs) in accordance with aspects of the disclosure.
Figure 4A:
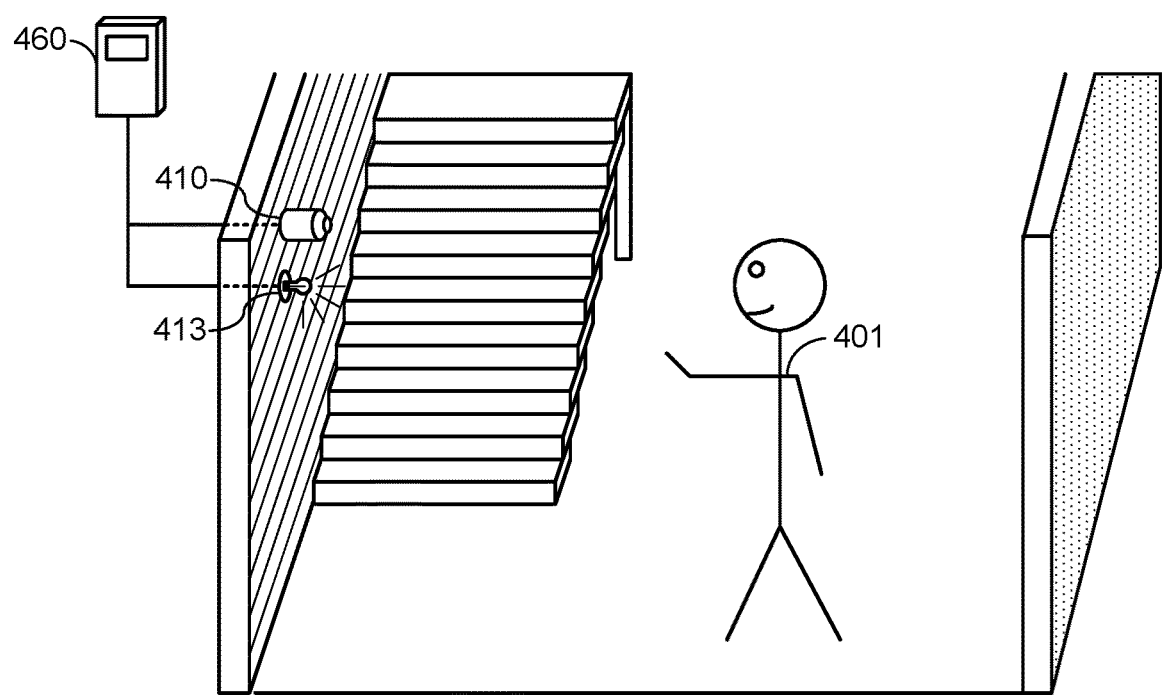
FIG. 4A generally illustrates a first scenario in which various IoT devices interact with a supervisor device, one another, and/or a user of the IoT system.
Figure 4B:
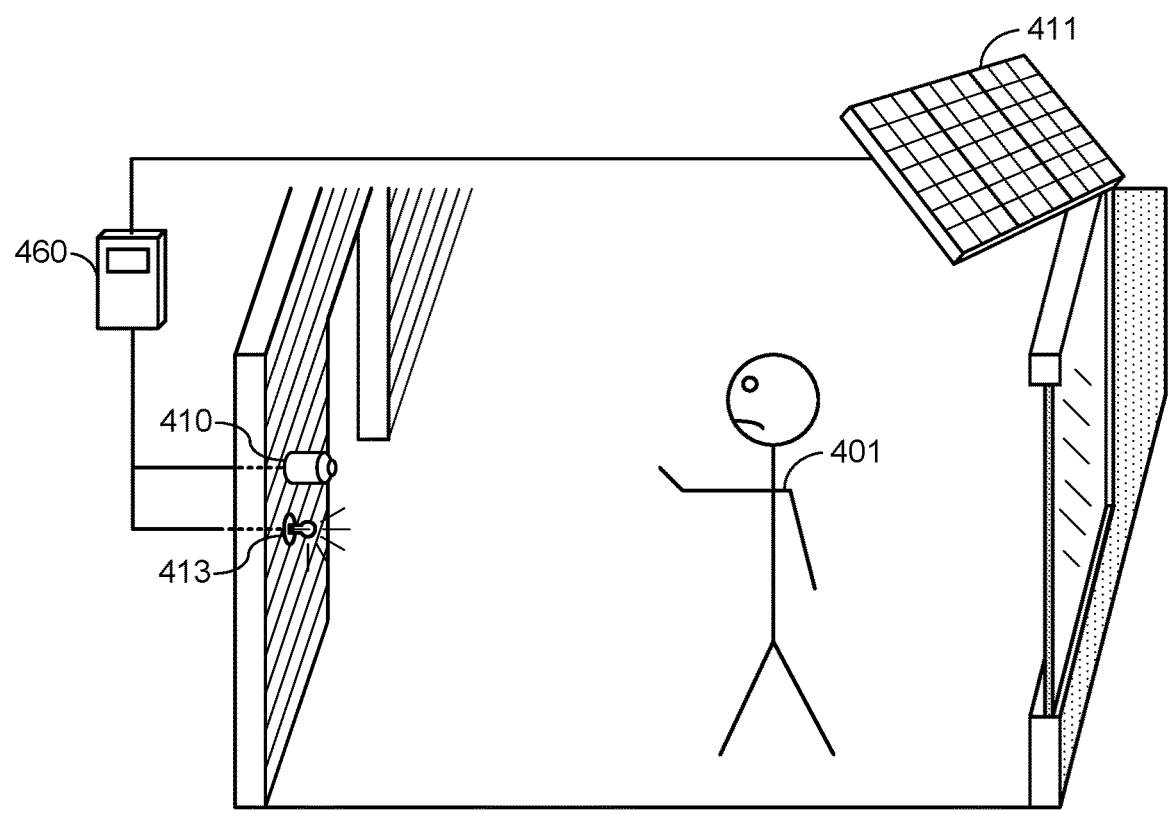
FIG. 4B generally illustrates a second scenario different from the first scenario.

FIGS. 1-3 relate to IoT systems generally. In accordance with aspects of the disclosure, the IoT system in FIGS. 1-3 may be equipped with a gesture recognition algorithm that analyzes received image data and translates the image data into user feedback data. FIGS. 4A-4B depict scenarios in which the gesture recognition algorithm may be utilized for training purposes. The user feedback data generated using the gesture recognition algorithm may subsequently be used to reconfigure the IoT system so as to increase user satisfaction (for example, by maximizing the amount of positive user feedback). The reconfiguring may include confidence adjustments, monitoring of new contextual conditions, adjustment of trigger conditions, or any other suitable reconfiguring. FIGS. 5-9 generally illustrate the details of one or more gesture recognition algorithms in accordance with aspects of the disclosure.

FIG. 1 illustrates a high-level system architecture of an IoT system 100 in accordance with an aspect of the disclosure. The IoT system 100 contains a plurality of IoT devices, which include an image sensor 110, a solar panel 111, an HVAC unit 112 (where HVAC stands for "heating, ventilation, and air conditioning"), a lamp 113, a thermostat 114, a refrigerator 116, and a washer and dryer 118.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other IoT devices over a wired or wireless connection. An IoT system may comprise any combination of IoT devices.

Referring to FIG. 1, IoT devices 110-118 are configured to communicate with an access network (e.g., an access point 120) over a physical communications interface or layer. As shown in FIG. 1, the communication interface may be an air interface 122 and/or a direct wired connection 124. The air interface 122 may comply with a wireless Internet protocol (IP), such as IEEE 802.11. Although FIG. 1 illustrates IoT devices 110-118 communicating over the air interface 122 and washer and dryer 118 communicating over the direct wired connection 124, it will be understood that each IoT device may communicate over a wired or wireless connection, or both.

The Internet 130 includes a number of routing agents and processing agents (not shown in FIG. 1 for the sake of convenience). The Internet 130 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1, a computer 140, such as a desktop or personal computer (PC), is shown as connecting to the Internet 130 directly (e.g., over an Ethernet connection or Wi-Fi or 802.11-based network). The computer 140 may have a wired connection to the Internet 130, such as a direct connection to a modem or router, which, in an example, can correspond to the access point 120 itself (e.g., for a Wi-Fi router with both wired and wireless connectivity). Alternatively, rather than being connected to the access point 120 and the Internet 130 over a wired connection, the computer 140 may be connected to the access point 120 over air interface 122 or another wireless interface, and access the Internet 130 over the air interface 122. Although illustrated as a desktop computer, computer 140 may be a laptop computer, a tablet computer, a PDA, a smart phone, or the like. The computer 140 may be an IoT device and/or contain functionality to manage an IoT network/group, such as the network/group of IoT devices 110-118.

The access point 120 may be connected to the Internet 130 via, for example, an optical communication system, such as FiOS, a cable modem, a digital subscriber line (DSL) modem, or the like. The access point 120 may communicate with IoT devices 110-118 and the Internet 130 using the standard Internet protocols (e.g., TCP/IP).

Referring to FIG. 1, an IoT server 150 is shown as connected to the Internet 130. The IoT server 150 can be implemented as a plurality of structurally separate servers, or alternately may correspond to a single server. In an aspect, the IoT server 150 is optional, and the group of IoT devices 110-118 may be a peer-to-peer (P2P) network. In such a case, the IoT devices 110-118 can communicate with each other directly over the air interface 122 and/or the direct wired connection 124. Alternatively, or additionally, some or all of IoT devices 110-118 may be configured with a communication interface independent of air interface 122 and direct wired connection 124. For example, if the air interface 122 corresponds to a Wi-Fi interface, one or more of the IoT devices 110-118 may have Bluetooth or NFC interfaces for communicating directly with each other or other Bluetooth or NFC-enabled devices. In a peer-to-peer network, service discovery schemes can multicast the presence of nodes, their capabilities, and group membership. The peer-to-peer devices can establish associations and subsequent interactions based on this information.

The IoT system 100 may optionally include a supervisor device 160. In one aspect of the disclosure, the supervisor device 160 may generally observe, monitor, control, or otherwise manage the various other components in the IoT system 100. For example, the supervisor device 160 may communicate with an access network (e.g., access point 120) over air interface 122 and/or a direct wired connection 124 to monitor or manage attributes, activities, or other states associated with the various IoT devices 110-118 in the IoT system 100. The supervisor device 160 may have a wired or wireless connection to the Internet 130 and optionally to the IoT server 150. The supervisor device 160 may obtain information from the Internet 130 and/or the IoT server 150 that can be used to further monitor or manage attributes, activities, or other states associated with the various IoT devices 110-118. The supervisor device 160 may be a standalone device (as shown), but it will be understood that the supervisor device may include or be included in one of the IoT devices 110-118, the access point 120, the computer 140, or any other electronic device (smartphone, tablet, etc.). The supervisor device 160 may be a physical device or a software application running on a physical device. The supervisor device 160 may include a user interface that can output information relating to the monitored attributes, activities, or other states associated with the IoT devices 110-118 and receive input information to control or otherwise manage the attributes, activities, or other states associated therewith. Accordingly, the supervisor device 160 may generally include various components and support various wired and wireless communication interfaces to observe, monitor, control, or otherwise manage the various components in the IoT system 100.

In addition to the various IoT devices 110-118, the IoT system 100 shown in FIG. 1 may further include one or more passive IoT devices (in contrast to the active IoT devices 110-118) that can be coupled to or otherwise made part of the IoT system 100. In general, the passive IoT devices may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, a first passive IoT device may include a coffee cup and a second passive IoT device container of orange juice. Each may have an RFID tag or barcode. A cabinet IoT device may have an appropriate scanner or reader that can read the RFID tag or barcode to detect when the coffee cup has been added or removed from the cabinet IoT device. The refrigerator IoT device 116 may have an appropriate scanner or reader that can read the RFID tag or barcode to detect when the container of orange juice has been added or removed from the refrigerator IoT device 116. In response to the cabinet IoT device detecting the removal of the coffee cup and the refrigerator IoT device 116 detecting the removal of the container of orange juice, the supervisor device 160 may receive one or more signals that relate to the activities detected at the cabinet IoT device and the refrigerator IoT device 116. The supervisor device 160 may then infer that a user is drinking orange juice from the coffee cup and/or likes to drink orange juice from a coffee cup.

Although the foregoing describes the passive IoT devices as having some form of RFID tag or barcode communication interface, the passive IoT devices may include one or more devices or other physical objects that do not have such communication capabilities. For example, certain IoT devices may have appropriate scanner or reader mechanisms that can detect shapes, sizes, colors, and/or other observable features associated with the passive IoT devices to identify the passive IoT devices. In this manner, any suitable physical object may communicate its identity and attributes and become part of the IoT system 100 and be observed, monitored, controlled, or otherwise managed with the supervisor device 160. Further, passive IoT devices may be coupled to or otherwise made part of the IoT system 100 in FIG. 1 and observed, monitored, controlled, or otherwise managed in a substantially similar manner.

FIG. 2A illustrates a high-level example of an IoT device 200A in accordance with aspects of the disclosure. While external appearances and/or internal components can differ significantly among IoT devices, many IoT devices will have some sort of user interface, which may comprise a display and a means for user input. IoT devices without a user interface may be communicated with remotely over a wired or wireless network, such as air interface 122 in FIG. 1.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 122 in FIG. 1 and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to a processing system 208 including one or more processing devices, such as a microcontroller, microprocessor, application specific integrated circuit, digital signal processor (DSP), programmable logic circuit, or other data processing device. The processing system 208 can execute application programming instructions within a memory system 212 of the IoT device 200A. The memory system 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processing system 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., the processing system 208) or any combination of software and hardware to achieve the functionality disclosed herein. For example, the transceiver 206, the processing system 208, the memory system 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processing system 208, memory system 212, or certain other components. Instead, in one aspect, the passive IoT device 200B may only include an I/O interface 214 or other suitable mechanism that allows the passive IoT device 200B to be observed, monitored, controlled, managed, or otherwise known within a controlled IoT network. For example, in one aspect, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

FIG. 2C illustrates another high-level example of a passive IoT device 200C in accordance with aspects of the disclosure. In general, the passive IoT device 200C shown in FIG. 2C may include various components that are the same and/or substantially similar to the IoT devices 200A-200B shown in FIGS. 2A-2B, which was described in greater detail above. As such, for brevity and ease of description, various details relating to certain components in the passive IoT device 200C shown in FIG. 2C may be omitted herein to the extent that the same or similar details have already been provided above in relation to the IoT devices 200A-200B shown in FIGS. 2A-2B.

The passive IoT device 200C shown in FIG. 2C may generally differ from the IoT device 200B shown in FIG. 2B in that the passive IoT device 200C may not have a transceiver 206, or certain other components. Instead, in one aspect, the passive IoT device 200C may only include an I/O interface 214 or other suitable mechanism that allows the passive IoT device 200C to be observed, monitored, controlled, managed, or otherwise known within a controlled IoT network. For example, in one aspect, the I/O interface 214 associated with the passive IoT device 200B may include a barcode, RFID tag, or any other suitable I/O interface that can provide an identifier and attributes associated with the passive IoT device 200C to another device.

Although the foregoing describes the passive IoT devices 200B-200C as having some form of RF, barcode, or other I/O interface 214, the passive IoT devices 200B-200C may omit the I/O interface 214. For example, certain IoT devices may have appropriate scanner or reader mechanisms that can detect shapes, sizes, colors, and/or other observable features associated with the passive IoT devices 200B-200C to identify the passive IoT devices 200B-200C. In this manner, any suitable physical object may communicate its identity and attributes and be observed, monitored, controlled, or otherwise managed within a controlled IoT network.

FIG. 3 illustrates examples of UEs (i.e., client devices) in accordance with an aspect of the disclosure. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 330A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to Wi-Fi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the Internet 130 and/or other remote servers and networks (e.g., IoT server 150, web URLs, etc.). The platform 302 can include a transceiver 306 operably coupled to a processing system 308, including an application specific integrated circuit (ASIC), microprocessor, logic circuit, other data processing device, or any combination thereof. The processing system 308 or other processor executes the application programming interface (API) 310 layer that interfaces with any resident programs in the memory system 312 of the UEs 300A and 300B. The memory system 312 can be comprised of read-only or random-access memory (RAM and ROM), EEPROM, flash cards, or any memory common to computer platforms. The platform 302 also can include a local database 314 that can store applications not actively used in the memory system 312, as well as other data. The local database 314 is typically a flash memory cell, but can be any secondary storage device as known in the art, such as magnetic media, EEPROM, optical media, tape, soft or hard disk, or the like.

Accordingly, an aspect of the disclosure can include a user equipment (UE) including the ability to perform the functions described herein. As will be appreciated by those skilled in the art, the various logic elements can be embodied in discrete elements, software modules executed on a processor or any combination of software and hardware to achieve the functionality disclosed herein. For example, the processing system 308, memory system 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of UEs 300A and 300B in FIG. 3 are to be considered merely illustrative and the disclosure is not limited to the illustrated features or arrangement.

The wireless communication to and from the UEs 300A and/or 300B can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs using a variety of networks and configurations. Accordingly, the illustrations provided herein are not intended to limit the aspects of the disclosure and are merely to aid in the description of aspects of aspects of the disclosure.

FIGS. 4A-4B generally illustrate different scenarios in which various IoT devices interact with a supervisor device, one another, and/or a user of the IoT system.

In FIG. 4A, a user 401 is depicted in a basement of a home equipped with an IoT system analogous to the IoT system 100 depicted in FIG. 1. An image sensor 410 (analogous to the image sensor 110 depicted in FIG. 1) is provided in the basement, as is a lamp 413 (analogous to the lamp 113 depicted in FIG. 1). The image sensor 410 and the lamp 413 may be configured to interact with a supervisor device 460 (analogous to the supervisor device 160 depicted in FIG. 1). Although a direct wired connection is shown (analogous to the direct wired connection 124 depicted in FIG. 1), it will be understood that the image sensor 410 and the lamp 413 may communicate with the supervisor device 460 in any suitable manner set forth in the present disclosure.

In the scenario depicted in FIG. 4A, the user 401 has descended the stairs into a dark basement. The image sensor 410 determines that the user 401 has entered the basement, and activates the lamp 413. As noted above, the image sensor 410 may interact with the lamp 413 in any suitable manner, for example, directly using peer-to-peer communications or in tandem with the supervisor device 460. The user 401 takes notice of the fact that the lamp 413 has been activated, and signals her approval with, for example, a hand gesture, a facial gesture, or any other suitable movement. The image sensor 410 and/or supervisor device 460 may be configured to recognize and interpret the gesture.

Given the ability to recognize and interpret gestures, the IoT system depicted in FIG. 4A can obtain real-time feedback directly from the user 401. In particular, when the user 401 gestures her approval, the IoT system may recognize the gesture and interpret the gesture as being a sign of approval.

Based on the positive feedback, the IoT system may be configured to conclude that the user 401 may prefer that the lamp 413 be activated when the user 401 enters the basement. As a result, the IoT system may in the future activate the lamp 413 when the user 401 enters the basement, or increase the likelihood that the activation of the lamp 413 will be triggered when the user 401 enters the basement.

In FIG. 4B, the user 401 is depicted in a sunroom having one or more large windows. In the scenario depicted in FIG. 4B, the user 401 has entered the sunroom, which is brightly illuminated by natural sunlight. The image sensor 410 determines that the user 401 has entered the sunroom, and activates the lamp 413.

The user 401 concludes that it is wasteful to activate the lamp 413 in the sunroom on a bright, sunny day, and may disapprove of the activation of the lamp 413. The user 401 signals her disapproval with a gesture, and the image sensor 410 and/or supervisor device 460 recognizes the gesture and interprets it as being a sign of disapproval. As a result, the IoT system may in the future avoid activation of the lamp 413 when the user 401 enters the sunroom, or decrease the likelihood that activation of the lamp 413 will be triggered when the user 401 enters the basement.

In one example scenario, the IoT system may be trained to activate the lamp 413 in the sunroom only if it is cloudy or dark. In some implementations, the IoT system may be able to determine whether there is sufficient sunlight in the sunroom using the solar panel 411 (analogous to the solar panel 111 depicted in FIG. 1). In other implementations, the IoT system may rely on a light sensor, an internal clock and/or a weather indicator received via the Internet 130.

Accordingly, the user 401 may train the IoT system by providing a mixture of positive user feedback (when it is sunny) and negative user feedback (when it is cloudy or dark). The training may be accomplished by recognizing the gestures of the user 401 and interpreting the recognized gesture. For example, identifying the recognized gesture as indicating positive user feedback, negative user feedback, or any other suitable type of feedback. The training may be promoted by taking note of contextual conditions (for example, sun exposure levels detected by the solar panel 411), and reconfiguring the trigger for performing the lamp 413 activation in response to the contextual conditions.

FIG. 5 generally illustrates a multi-component gesture captured within several distinct image frames, in particular, a first image frame 501, a second image frame 502, and a third image frame 503. The image frames 501-503 may be part of a sequence of frames. The sequence of frames may be a sequence of consecutive frames captured by an image sensor (analogous to the image sensor 110 and/or the image sensor 410) or a sampling of a sequence of consecutive frames (for example, every third captured frame, every tenth captured frame, etc.).

As used herein, the term "frame" or "image frame" may encompass any unit of any suitable computer vision technique. For example, the "frame" or "image frame" may be a synthetic composite model of an image, such as might be used in an event based sensor.

The first image frame 501 may be captured within a first time window that commences upon the performance of some IoT function (for example, activation of the lamp 413 as in the example from FIGS. 4A-4B). The second image frame 502 may be captured within a second time window following the capture of the first image frame 501. The third image frame may be captured within a third time window following the capture of the second image frame 502. The respective time windows may have the same duration or different durations. As an example, the first time window may have a duration of twenty seconds, and the second and third time windows may have durations of one second. It will be further understood that the time window durations may also be expressed in terms of a number of captured frames rather than a unit of time.

A human observer of the image frames 501-503 would understand them to be images of the palm side of a human hand. In the first image frame 501, the hand is tilted slightly left, in the second image frame 502, the hand is straight up and down, and in the third image frame 503, the hand is tilted slightly to the right. A human observer may interpret the image frames 501-503 as a multi-component gesture, in particular, a wave of a hand.

In accordance with aspects of the disclosure, the IoT system may be configured to recognize a particular multi-component gesture (such as, for example, the wave of the hand) and interpret the recognized gesture. Returning to the examples of FIGS. 4A-4B, the wave of the hand may be recognized by the IoT system based on a sequence of image frames captured by the image sensor 410. Moreover, the wave of the hand may be interpreted as positive feedback, or any other type of feedback. In some implementations, the IoT system may be configured to recognize a plurality of different multi-component gestures and distinguish among them. The different multi-component gestures may be interpreted as signaling different types of feedback.

As will be understood from FIG. 5, the first image frame 501 includes a first object 511, the second image frame 502 includes a second object 512, and the third image frame 503 includes a third object 513. As depicted in FIG. 5, the objects 511-513 are the same object (the palm side of a human hand), but at different rotations (for example, −15 degrees, 0 degrees, +15 degrees, or +30 degrees, 0 degrees, −30 degrees, etc.). However, it is not necessary that the objects 511-513 be the same object. It is only necessary that each of the objects be recognizable by the IoT system. As an example, the first and second objects could be hands and the third object could be a face.

The IoT system may be configured to detect a particular recognizable object in an image frame using object models.

The IoT system may detect a match between the contents of a particular image frame and a particular object model by processing the image frame to detect an object similar to the object model. In the scenario depicted in FIG. 5, the first object model may be a hand shape that is tilted by −15 degrees, and the IoT system may determine, based on a comparison of the first object 511 to the first object model, that the first image frame 501 includes an object corresponding to the first object model.

As will be discussed in greater detail below (for example, FIG. 6), the determination by the IoT system that the first image frame 501 includes an object corresponding to the first object model may trigger performance of one or more additional functions. For example, in response to a determination that the first image frame 501 includes an object corresponding to the first object model, the IoT system may attempt to detect, during each image frame in a subsequent time window, an object corresponding to the second object model.

A determination that the second image frame 502 includes an object corresponding to the second object model may trigger performance of one or more additional functions. For example, in response to a determination that the second image frame 502 includes an object corresponding to the second object model, the IoT system may attempt to detect, during each image frame in a subsequent time window, an object corresponding to the third object model.

Although the multi-component gesture depicted in FIG. 5 includes a sequence of three object models, it will be understood that only two object models are necessary for a multi-component gesture. Moreover, the sequence could include any number of object models, for example, six object models, sixty object models, or six hundred object models. As noted above, it is not necessary that the objects 511-513 be the same object. Similarly, it is not necessary that the different object models have the same shape (for example, the shape of an open hand as depicted in FIG. 5).

As noted above, the objects 511-513 depicted in FIG. 5 are, to a human observer, the same object in different positions. However, the IoT system is not necessarily configured to track an object as it rotates. In fact, the cost of tracking a recognized object may be prohibitive, especially for low-power image sensors. Instead of using a costly tracking algorithm to track a single object as it moves through each and every frame of the sequence, the IoT system may simply detect one of a small number of recognizable objects, record the result of the detection, and move on to the next frame in search of another recognizable object. In some implementations, the IoT system may discard any frame in which no recognizable object is detected. The power cost of detecting one of a small set of objects in an image frame may be relatively small compared to the power cost of tracking the detected object as it changes position or orientation.

Figure 6:
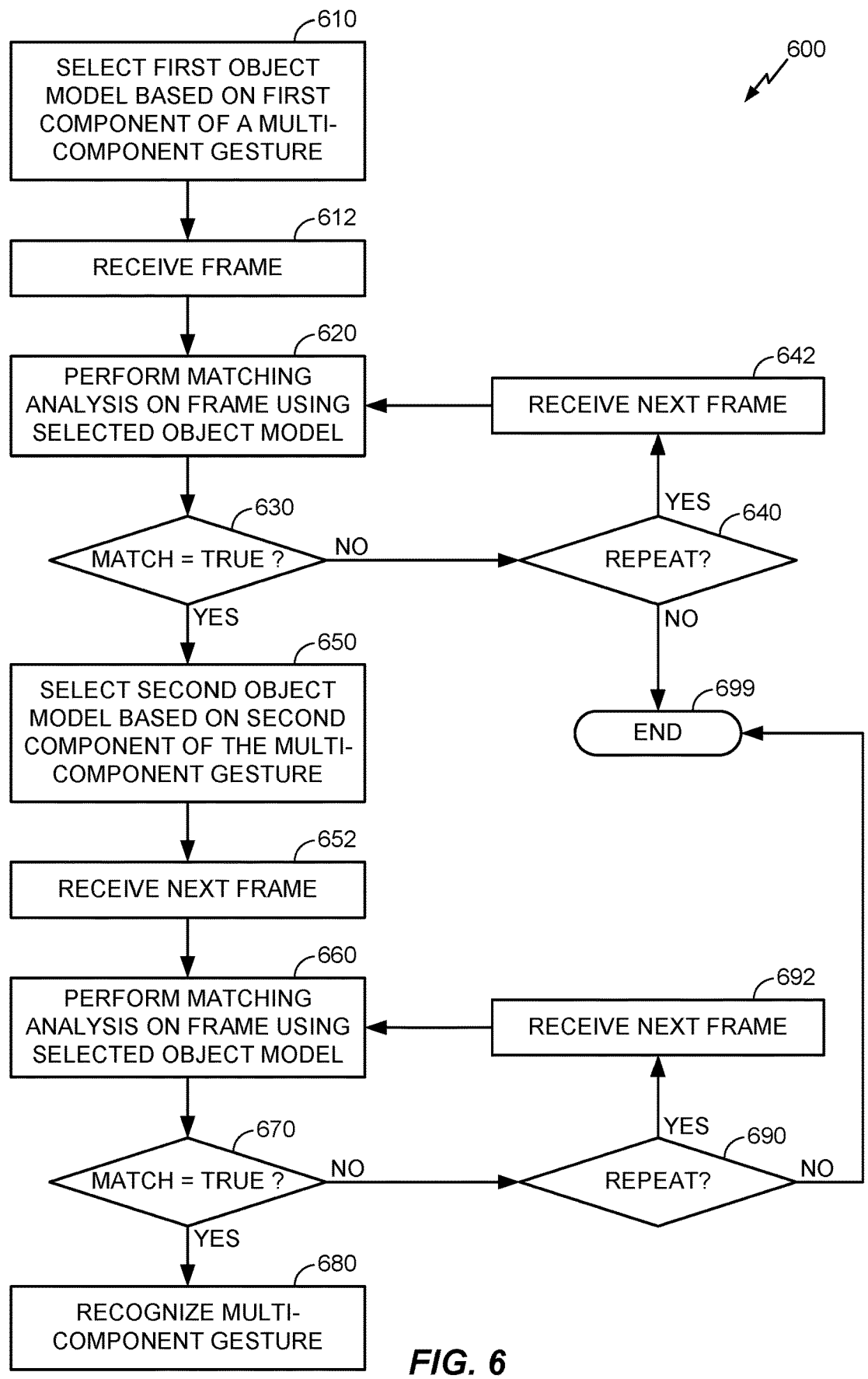
FIG. 6 generally illustrates a method for recognizing a multi-component gesture.

FIG. 6 generally illustrates a method 600 for recognizing a multi-component gesture in accordance with aspects of the disclosure.

At 610, the method 600 selects a first object model based on a first component of a multi-component gesture. Although not shown, the selecting at 610 may be triggered by performance of a particular IoT function, for example, activation of the lamp 413 depicted in FIGS. 4A-4B.

At 612, the method 600 receives an image frame. The image frame may be captured by, for example, the image sensor 410 depicted in FIGS. 4A-4B.

At 620, the method 600 performs a matching analysis on the frame received at 612 using the object model selected at

Figure 7:
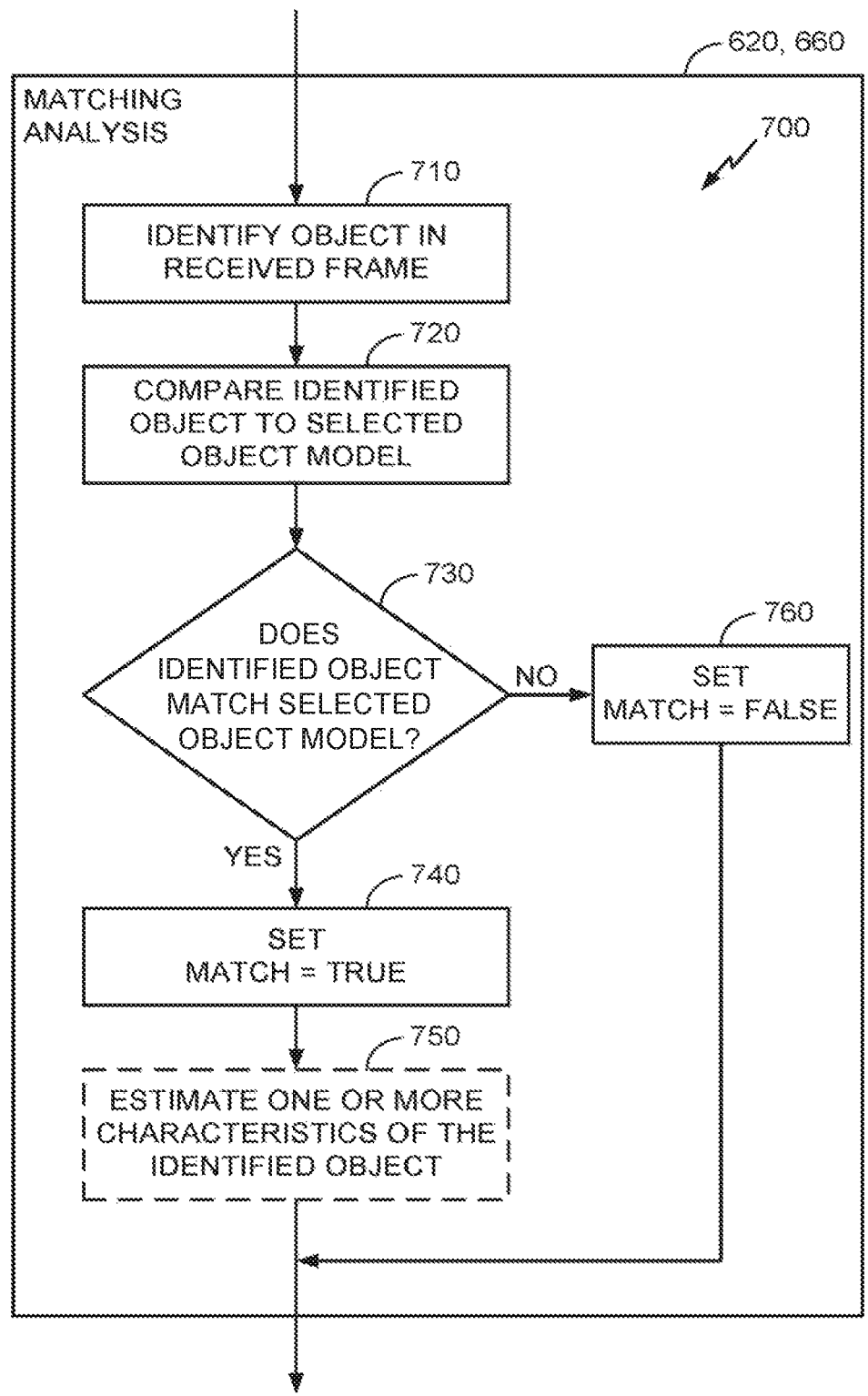
FIG. 7 generally illustrates an example implementation of a method for performing the matching analysis depicted in FIG. 6.

610. An exemplary detail of the matching at 620 is depicted in FIG. 7, as will be discussed in greater detail below.

At 630, the method 600 proceeds to 640 if there is no match between the frame received at 612 and the object model selected at 610 ('no' at 630). If there is a match ('yes' at 630), then the method 600 proceeds to 650.

As depicted in FIG. 6, only one object model is selected at 610, only one matching analysis is performed at 620, and only one match is detected at 630. However, it will be understood that the method 600 may be adapted so that a plurality of different object models are selected, analyzed, and matched in parallel. For example, in an IoT system that is capable of recognizing multiple gestures (for example, gesture X and gesture Y), it may be necessary to select a first object model based on a first component of gesture X (as shown in 610), while also selecting a different object model based on a first component of gesture Y. In this way, the method 600 may be configured to recognize the respective first components of a plurality of different object models.

At 640, the method 600 determines whether to repeat the matching analysis on the next frame in the sequence. In some implementations, the image frame received at 612 is captured within a first time window that begins immediately subsequent to the performance of the particular IoT function and ends after a set duration. The duration of the first time window may be selected arbitrarily, and may correspond to an amount of time within which the user 401 might be expected to provide feedback, for example, twenty seconds. If the next frame has been captured during the first time window, then the method 600 may proceed to 642 ('yes' at 640). If the next frame was captured after the first time window terminated, then the method 600 may proceed to 699 ('no' at 640).

At 642, the method 600 receives the next frame and returns to the matching at 620, wherein the next frame received at 642 is compared to the object model selected at 610. The next image frame may be received at 642 from, for example, the image sensor 410 depicted in FIGS. 4A-4B.

At 650, the method 600 selects a second object model based on a second component of a multi-component gesture. It will be understood that the selection at 650 of the second object model may be triggered by a determination at 630 that the previous frame matched the first object model selected at 610.

At 652, the method 600 receives the next frame in the sequence. The next image frame may be received at 652 from, for example, the image sensor 410 depicted in FIGS. 4A-4B.

At 660, the method 600 performs a matching analysis on the frame received at 652 using the object model selected at 650. The matching at 660 may be similar to the matching at 620, and may correspond to the matching depicted in FIG. 7, as will be discussed in greater detail below.

At 670, the method 600 proceeds to 680 if there is a match between the frame received at 652 and the second object model selected at 650 ('yes' at 670). If there is not a match, then the method 600 proceeds to 690 ('no' at 670).

As depicted in FIG. 6, only one object model is selected at 650, only one matching analysis is performed at 660, and only one match is detected at 670. However, it will be understood that the method 600 may be adapted so that a plurality of different object models are selected, analyzed, and matched in parallel. For example, a plurality of different recognizable gestures (for example, gesture $X_1$ and gesture $X_2$) may each begin with the same gesture component, and may only be distinguishable from one another after a subsequent gesture component is recognized. Accordingly, in an IoT system that is configured to distinguish between gesture $X_1$ and gesture $X_2$, it may be necessary to select a second object model based on a second component of gesture $X_1$, while also selecting a different second object model based on a second component of gesture $X_2$. In this way, the method 600 may be configured to distinguish between a plurality of different multi-component gestures, even if the gestures begin with the same gesture component.

At 680, the method 600 recognizes a multi-component gesture. Based on the recognition at 680, the IoT system may interpret the recognized multi-component gesture as indicating particular user feedback. The IoT system may then be reconfigured based on user feedback data. In particular, the IoT system may adjust confidence levels, monitor new contextual conditions, adjust trigger conditions, or any other suitable reconfiguring.

Although the foregoing discussion is concerned with positive feedback gestures and negative feedback gestures, it will be understood that the IoT system may only be configured to recognize and interpret a single gesture. Moreover, the IoT system may be configured to recognize a spectrum of feedback gestures, for example, strongly approve, approve, disapprove, and strongly disapprove. If no gesture is recognized by the image sensor 410, then the IoT system may interpret this as tacit approval, i.e., weak positive feedback.

At 690, the method 600 determines whether to repeat the matching analysis on the next frame in the sequence. In some implementations, the image frame received at 652 is captured within a second time window that begins immediately subsequent to the determining at 630 and ends after a set duration. The duration of the second time window may be selected arbitrarily, and may correspond to an amount of time within which the user 401 might be expected to proceed from the first component of the multi-component gesture to the second component of the multi-component gesture, for example, one second. If the next frame has been captured during the second time window, then the method 600 may proceed to 692 ('yes' at 690). If the second time window has ended, then the method 600 may proceed to 699 ('no' at 690).

At 692, the method 600 receives the next frame in the sequence. The next image frame may be received at 692 from, for example, the image sensor 410 depicted in FIGS. 4A-4B.

At 699, the method 600 ends. The method 600 may be triggered again at a later time by a repeat performance of the particular IoT function.

It will be understood from FIG. 6 that the example multi-component gesture recognized at 680 is a two-component gesture. However, this is solely for illustrative purposes. For example, instead of recognizing a two-component gesture after matching two objects, the method 600 may select a third object model based on the third component of a three-component gesture (for example, the three-component gesture depicted in FIG. 5). The method 600 may further perform a matching analysis (analogous to the matching analysis at 660) and may recognize the three-component gesture only after matching three objects. It will be understood that a multi-component gesture with any number of components may be recognized in accordance with FIG. 6 by inserting a new stage of object model selection and matching analysis prior to the recognizing at 680.

FIG. 7 generally illustrates an example implementation of a method 700 for performing the matching analysis depicted in FIG. 6. It will be understood by reference to FIG. 6 that at the time the method 700 commences, an object model has been selected (as at 610 or 650 of FIG. 6) and a frame has been received (as at 612, 642, 652, or 692 of FIG. 6).

At 710, the method 700 identifies an object in the received frame. The object may have a particular shape, size, and/or orientation. In some implementations, object identification or other image frame analysis may be optimized using machine learning and performed using hardware acceleration.

At 720, the method 700 compares the object identified at 710 to the selected object model. The selected object model may have a particular shape, size, and/or orientation.

At 730, the method 700 determines whether the identified object matches the selected object model. If there is a match between the identified object and the selected object model ('yes' at 730), then the method 700 proceeds to 740. If there is not a match between the identified object and the selected object model ('no' at 730), then the method 700 proceeds to 760.

At 740, the method 700 sets a match indicator to TRUE. Returning to FIG. 6, it will be understood that setting the match indicator to TRUE will lead to a 'yes' determination at 630 or 670.

At 750, the method 700 optionally estimates one or more characteristics of the identified object. For example, the method 700 may estimate a size of the identified object (for example, height and/or width), or a position of the identified object (for example, a center position). The estimates of the one or more characteristics may be expressed in any suitable manner, for example, as a pixel position in a two-dimensional array of pixels, or a distance between two pixel positions. The reasons why the optional estimation at 750 might be incorporated will become apparent from the parts of the disclosure relating to FIGS. 8-9.

At 760, the method 700 sets a match indicator to FALSE. Returning to FIG. 6, it will be understood that setting the match indicator to FALSE will lead to a 'no' determination at 630 or 670.

Figure 8:
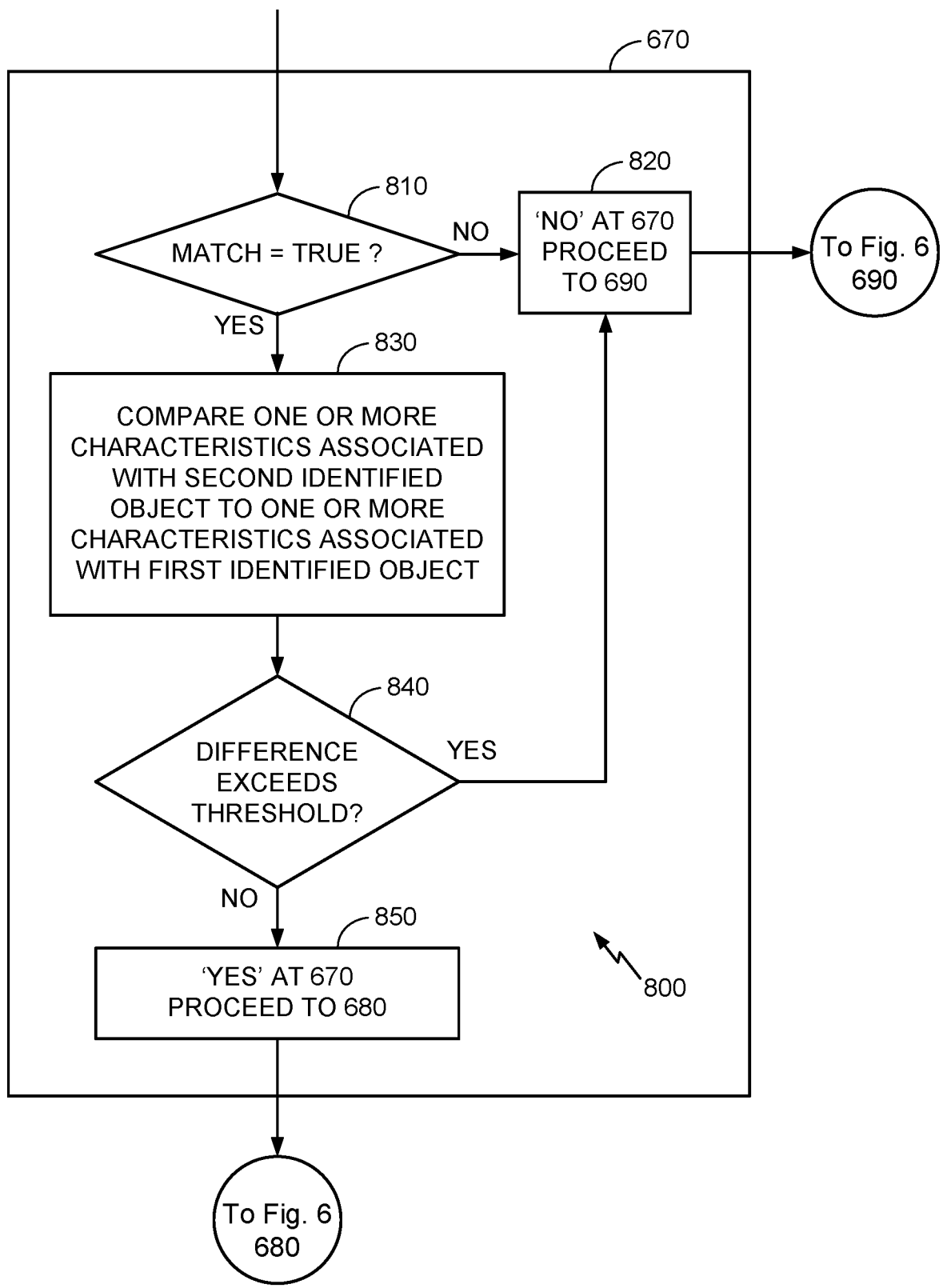
FIG. 8 generally illustrates another example implementation of a method for performing the match determination depicted in FIG. 6.

FIG. 8 generally illustrates an example implementation of a method 800 for performing the match determining at 670 depicted in FIG. 6. It will be understood by reference to FIG. 6 that at the time the method 800 commences, a first object matching the first object model has been identified and a second object matching the second object model has also been identified. Moreover, one or more characteristics of the first object and one or more characteristics of the second object have been estimated (as at 750).

At 810, the method 800 determines if there is a match between the frame received at 652 and the second object model selected at 650. The match determining at 810 may be similar and/or equivalent to the match determining at 670. But, as will be discussed in greater detail below, there may be additional tasks to be performed in addition to the match determining at 670 before proceeding to 680. If there is not a match between the frame received at 652 and the second object model selected at 650, then the method 800 proceeds to 820 ('no' at 810). If there is a match between the frame received at 652 and the second object model selected at 650 ('yes' at 810), then the method 800 proceeds to 830.

At 820, the method 800 determines that there is no match and the method 800 proceeds to 690.

At 830, the method 800 compares the one or more characteristics associated with the second identified object to the one or more characteristics associated with the first identified object. For example, a size and/or position of the first object may be compared to a size and/or position of the second object. The result of the comparison may be, for example, a difference in size and/or a difference in position.

At 840, the method 800 determines if the result of the comparison is a difference that is less than a threshold distance. If the method 800 determines that the difference exceeds the threshold ('yes' at 840), then the method 800 returns to 820. If the method 800 determines that the difference does not exceed the threshold ('no' at 840), then the method 800 proceeds to 850.

At 850, the method 800 determines that there is a match and the method 600 proceeds to 680.

As will be understood from FIG. 8, the method 800 is similar to the match determining at 670, except that there is a heightened requirement that must be met before declaring a match (and proceeding to 680). In particular, it is not sufficient for the second identified object to match the second object model (as at 670 depicted in FIG. 6). Instead, it is also necessary that the size and/or position of the object should not change drastically from one image frame to another. Enforcement of this heightened requirement may result in fewer false positives (for example, recognizing a gesture in the image data despite the fact that no gesture actually occurred).

Accordingly, FIG. 8 discloses a comparison of one or more characteristics of a second identified object to one or more characteristics of a first identified object. The comparison may be a basis for identifying a match of the second identified object. However, a similar affect can be realized using other techniques.

For example, the matching analysis performed at 660 depicted in FIG. 6 may be modified such that only a portion of the image is analyzed, rather than the entirety thereof. This technique may increase efficiency by reducing the amount of analysis that is performed.

As an example of this technique, we assume that first object is identified (for example, at 620-630) and that a first set of one or more characteristics is determined. Assume further that the first identified object fits within an area that does not fill the entirety of the image frame received at 612. For example, the area of a rectangle drawn around the first identified object may be 30% of the total area of the image frame. Moreover, the center of the rectangle is shifted 45 pixels upward relative to the center of the image frame.

As a result, the matching analysis at 660 may be made more efficient by searching only a portion of the next frame received at 652, in particular, a portion having a center that is shifted 45 pixels upward and a size that is 30% of the total area of the image frame. Alternatively, the total area of the analyzed portion may be slightly larger than 30% (for example, 40%) so that the identified object may change size (within tolerable bounds) during delivery of the multi-component gesture. Moreover, the center of the analyzed portion may be shifted less (for example, 35 pixels upward) so that the top (or some other extent) of the analyzed portion coincides with the top (or some other extent) of the image frame.

FIG. 9 generally illustrates a partial multi-component gesture captured within several distinct image frames, in particular, a first image frame 901, a second image frame 902, and a third image frame 903. The image frames 901-902 may be similar or equivalent to the image frames 501-502 depicted in FIG. 5. For example, the first image frame 901 may include a first object 911 and the second image frame 902 may include a second object 912. However, the third image frame 903 differs from the third image frame 503 in that the third object 913 has different characteristics from the third object 513 depicted in FIG. 5. In particular, the third object 913 is smaller and positioned toward the bottom right corner of the third image frame 903.

Accordingly, the third object 913, just like the third object 513, may match the third object model. However, the change in size and position raises questions as to whether it is proper to recognize the multi-component gestures depicted in FIGS. 5 and 9, respectively, as being the same multi-component gesture. For example, if the user 401 is walking away from the image sensor 410, this may imply that the user 401 is not providing feedback to the IoT system. Additionally or alternatively, the third object 913 may be the hand of a user different from the user 401 who is not attempting to communicate with the IoT system, but just so happens to be holding his hand a certain way.

If a method analogous to the method 800 depicted in FIG. 8 is implemented, then the one or more characteristics of the third object 913 may be compared to the one or more characteristics of the second object 912. If the difference exceeds a threshold, then a match cannot be declared.

As an example, the first object 911 may have a first height 921 and a first center position 931. Moreover, the second object 912 may have a second height 922 and a second center position 932. Moreover, the third object 913 may have a third height 923 and a third center position 933. It will be understood that the first height 921 and the second height 922 are at least similar if not the same. Moreover, the second center position 932 is only slightly shifted, if at all, from the first center position 931. Accordingly, in accordance with the determination at 840 depicted in FIG. 8, the method 800 will declare a match. It will be further understood that the third height 923 is significantly different from the second height 922. Moreover, the third center position 933 is significantly shifted relative to the second center position 932. Accordingly, in accordance with the determination at 840 depicted in FIG. 8, the method 800 will declare that there is no match.

Figure 10:
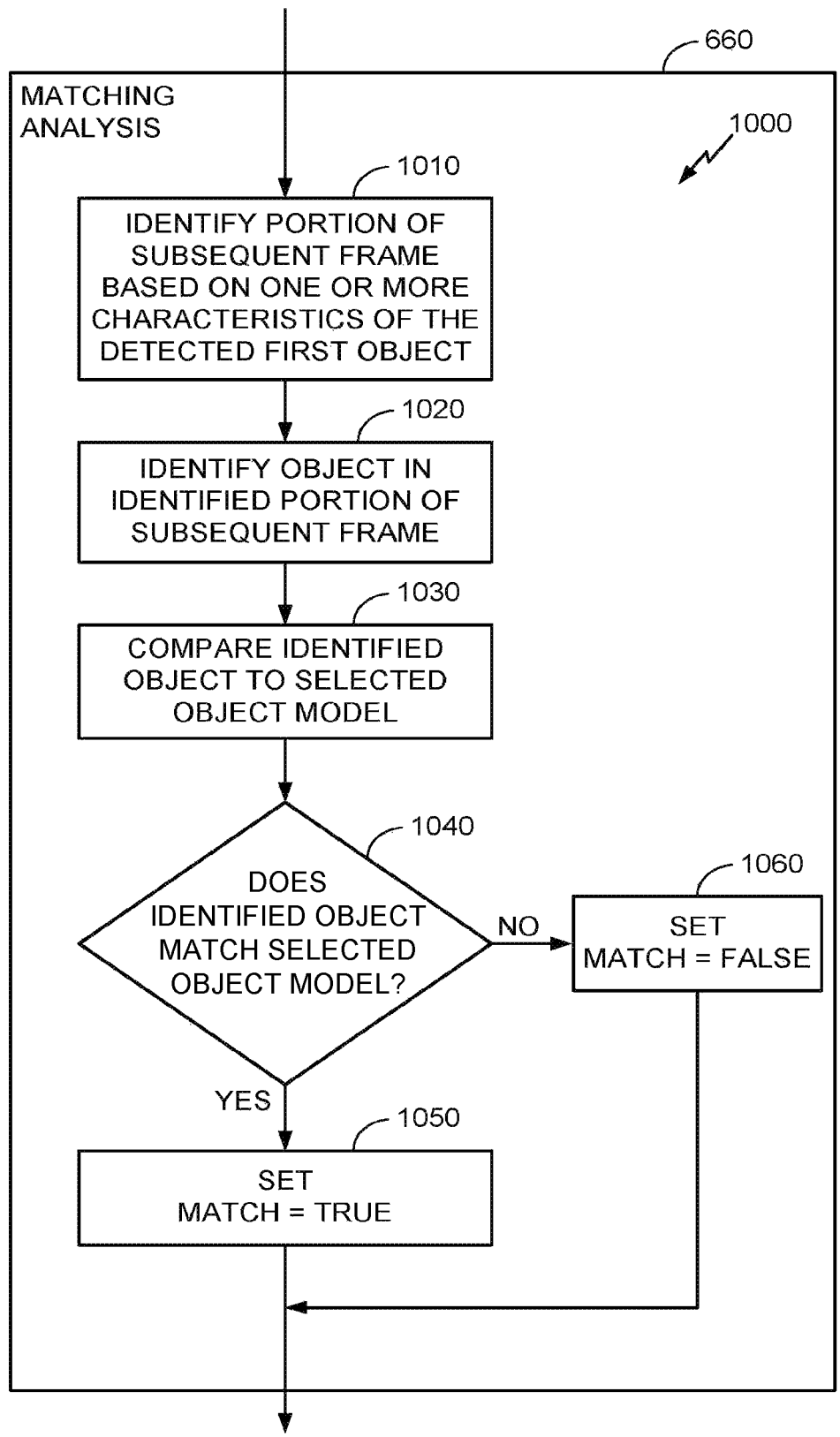
FIG. 10 generally illustrates yet another example implementation of a method for performing the matching analysis depicted in FIG. 6.

FIG. 10 generally illustrates yet another example implementation of a method for performing the matching analysis at 660 as depicted in FIG. 6.

Returning briefly to FIG. 6, it will be understood the matching analysis at 660 (to identify the second object) is performed subsequent to the matching analysis performed at 620 (to identify the first object). It will also be understood that one or more characteristics of the identified first object may have been estimated in a manner analogous to the estimating at 750 depicted in FIG. 7.

At 1010, the method 1000 identifies a portion of the subsequent frame received, for example, at 652 depicted in FIG. 6. The identified portion may be smaller than the entirety of the at least one subsequent frame. The identified portion may also correspond to the first object size and/or first object position estimated at 750 depicted in FIG. 7. For example, suppose the first object identified in the frame received at 612 has a width that is less than the width of the frame received at 612, a height that is less than the height of the frame received at 612, and a center position that is shifted relative to the center of the frame received at 612. At 1010, the identified portion of the frame received at 652 may have a width, height, and center position that correspond to the width, height, and center position of the identified first object. In some implementations, the correspondence may not be exact. For example, the width and height values associated with identified portion of the frame received at 652 may be 10% larger than the width and height values associated with the first object. In this manner, the method 1000 may ensure a certain degree of tolerance for position and size changes of the object.

At 1020, the method 1000 identifies the second object in the identified portion of the frame received at 652. As noted above, the identified portion may be smaller than the entirety of the frame received at 652. Accordingly, fewer resources are consumed because the analysis is performed on less than the entirety of the frame received at 652. Moreover, it will be understood that the method 1000 depicted in FIG. 10 may arrive at the same outcome as the method 800 depicted in FIG. 8 without consuming as many resources.

At 1030, the method 1000 compares the object identified at 1010 to the selected object model. The selected object model may have a particular shape, size, and/or orientation.

At 1040, the method 1000 determines whether the identified object matches the selected object model. If there is a match between the identified object and the selected object model ('yes' at 1040), then the method 1000 proceeds to 1050. If there is not a match between the identified object and the selected object model ('no' at 1030), then the method 1000 proceeds to 1060.

At 1050, the method 1000 sets a match indicator to TRUE. Returning to FIG. 6, it will be understood that setting the match indicator to TRUE at 1050 will lead to a 'yes' determination at 670.

At 1060, the method 1000 sets a match indicator to FALSE. Returning to FIG. 6, it will be understood that setting the match indicator to FALSE at 1060 will lead to a 'no' determination at 670.

FIG. 11 generally illustrates a partial multi-component gesture captured within several distinct image frames, in particular, a first image frame 110 land a second image frame 1103. FIG. 11 also depicts a mask frame 1102 that helps to illustrate how the analysis 660 may be performed in accordance with FIG. 10.

Returning briefly to FIG. 10, it will be understood that a portion of the frame received at 652 must be identified at 1010. The identifying at 1010 is based on one or more estimated characteristics of the detected first object.

In FIG. 11, the image frame 1101 includes the first object 1111. The first object 1111 may have a first height 1121 and a first center position 1131. The mask frame 1102 includes an analyzed portion 1142 that corresponds to the size and/or position of the first object 1111. The mask frame 1102 may further include a masked portion 1152. At 1020, the method 1000 may analyze the analyzed portion 1142 only, and may not analyze the masked portion 1152, thus conserving resources.

It will be understood that the mask frame 1102 is not an image frame analogous to the first image frame 1101 or the second image frame 1103. Rather, it is an illustration of how the method 1000 might divide a frame to be analyzed into an analyzed portion 1142 and a masked portion 1152, based on a size and/or position of the first object 1111.

The second image frame 1103 may include a second object 1113 that matches the second object model selected at 650. As depicted in FIG. 11, the second object 1113 may be entirely within the analyzed portion 1142. Accordingly, the second object 1113 may compare favorably to the second object model at 1030, and the match indicator may be set to TRUE at 1050.

It will be understood that if the second object 1113 was not entirely within the analysis portion 1142 (not shown in FIG. 11), it would not be identified at 1020. Because the masked portion 1152 contains at least a portion of the second object 1113, the second object 1113 would not, in that alternative case, be identified.

Various aspects are disclosed in the following description and related drawings to show specific examples relating to exemplary aspects of an IoT system. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted in all cases as "based at least in part on" rather than, for example, "based solely on" or "based only on".

Further, many aspects are described in terms of sequences of actions to be performed by, for example, elements of a computing device. It will be recognized that various actions described herein can be performed by specific circuits (for example, one or more general-purpose processors, a digital signal processor (DSP), an application specific integrated circuit (ASIC), a field programmable gate array (FPGA) or other programmable logic device, discrete gate or transistor logic, discrete hardware components, or any combination thereof). It will be further recognized that the various actions described herein can be performed by executing program instructions. Additionally, the sequence of actions described herein can be considered to be embodied entirely within a memory system comprising any form of computer-readable storage medium (for example, RAM, flash memory, ROM, EPROM, EEPROM, registers, hard disk, a removable disk, a CD-ROM, or any other form of storage medium known in the art). The memory system may store and/or provide code for causing a processing system to perform the corresponding functionality described herein. Accordingly, those skilled in the art will appreciate that the various illustrative logical blocks, modules, circuits, and algorithms described in connection with the aspects disclosed herein may be implemented as electronic hardware, computer software, or combinations of both. Whether such functionality is implemented as hardware or software or both depends upon the particular application and design constraints imposed on the overall system.

What is claimed is:

1. A method for recognizing a multi-component gesture within a sequence of image frames, the method comprising:
   selecting a first object model as a selected object model, wherein the first object model corresponds to a first component of the multi-component gesture;
   in response to selecting the first object model as the selected object model, receiving a frame in the sequence of image frames and analyzing the frame to determine whether the frame includes a first object that matches the selected first object model;
   in response to a determination that the frame includes the first object that matches the selected first object model, selecting a second object model as the selected object model, wherein the second object model corresponds to a second component of the multi-component gesture;
   in response to selecting the second object model as the selected object model, receiving at least one subsequent frame in the sequence of image frames and analyzing the at least one subsequent frame to determine whether the at least one subsequent frame includes a second object that matches the selected second object model; and
   in response to a determination that the at least one subsequent frame includes the second object that matches the selected second object model, recognizing that the multi-component gesture is present in the sequence of image frames.

2. The method of claim 1, further comprising:
   in response to the determination that the frame includes the first object that matches the selected first object model, estimating one or more characteristics of the first object, wherein the one or more characteristics of the first object include a first object size and/or a first object position.

3. The method of claim 2, further comprising:
   identifying, based on the one or more characteristics of the first object, a portion of the at least one subsequent frame to be analyzed, wherein the identified portion is smaller than the at least one subsequent frame and corresponds to the first object size and/or the first object position;
   wherein the analyzing of the at least one subsequent frame comprises analyzing the identified portion of the at least one subsequent frame to determine whether the identified portion of the at least one subsequent frame includes the second object that matches the selected second object model.

4. The method of claim 2, further comprising:
   in response to the determination that the at least one subsequent frame includes the second object that matches the selected second object model, estimating one or more characteristics of the second object; and
   comparing the one or more characteristics of the second object to the one or more characteristics of the first object to determine whether a difference between the one or more characteristics of the first object and the one or more characteristics of the second object exceeds a difference threshold.

5. The method of claim 4, wherein the recognizing that the multi-component gesture is present in the sequence of image frames is performed further in response to a determination that a difference between the one or more characteristics of the first object and the one or more characteristics of the second object does not exceed the difference threshold.

6. The method of claim 5, wherein:
   the one or more characteristics of the second object include a second object size and/or a second object position; and
   the determining that the difference does not exceed the difference threshold comprises:
      determining whether a difference between the first object size and the second object size does not exceed the difference threshold; and/or determining whether the difference between the first object position and the second object position does not exceed the difference threshold.

7. The method of claim 1, wherein the analyzing of the at least one subsequent frame comprises:
   analyzing a predetermined number of frames in the sequence of image frames that are immediately subsequent to the frame; and/or
   analyzing all frames in the sequence of image frames that are captured within a predetermined amount of time immediately subsequent to the frame.

8. The method of claim 7, further comprising:
   determining that none of the analyzed frames includes a second object that matches the selected second object model; and
   in response to the determination that none of the analyzed frames includes a second object that matches the selected second object model, reselecting the first object model as the selected object model.

9. The method of claim 1, further comprising:
   in response to a determination that the frame does not include the first object that matches the selected first object model, selecting a next frame in the sequence of image frames as the frame and repeating the analyzing of the frame to determine whether the frame includes a first object that matches the selected first object model.

10. The method of claim 1, wherein the analyzing of the frame and the analyzing of the at least one subsequent frame is performed using hardware acceleration.

11. An apparatus configured to recognize a multi-component gesture within a sequence of image frames, the apparatus comprising:
    a memory system, to store related data and instructions; and
    a processing system coupled to the memory system, the processing system being configured to:
    select a first object model as a selected object model, wherein the first object model corresponds to a first component of the multi-component gesture;
    in response to the selection of the first object model as the selected object model, receive a frame in the sequence of image frames and analyze the frame to determine whether the frame includes a first object that matches the selected first object model;
    in response to a determination that the frame includes the first object that matches the selected first object model, select a second object model as the selected object model, wherein the second object model corresponds to a second component of the multi-component gesture;
    in response to the selection of the second object model as the selected object model, receive at least one subsequent frame in the sequence of image frames and analyze the at least one subsequent frame to determine whether the at least one subsequent frame includes a second object that matches the selected second object model; and
    in response to a determination that the at least one subsequent frame includes the second object that matches the selected second object model, recognize that the multi-component gesture is present in the sequence of image frames.

12. The apparatus of claim 11, wherein the processing system is further configured to estimate one or more characteristics of the first object in response to the determination that the frame includes the first object that matches the selected first object model, wherein the one or more characteristics of the first object include a first object size and/or a first object position.

13. The apparatus of claim 12, wherein the processing system is further configured to:
    identify, based on the one or more characteristics of the first object, a portion of the at least one subsequent frame to be analyzed, wherein the identified portion is smaller than the at least one subsequent frame and corresponds to the first object size and/or the first object position;
    wherein to analyze the at least one subsequent frame, the processing system is further configured to analyze the identified portion of the at least one subsequent frame to determine whether the identified portion of the at least one subsequent frame includes the second object that matches the selected second object model.

14. The apparatus of claim 12, wherein the processing system is further configured to:
    estimate one or more characteristics of the second object in response to the determination that the at least one subsequent frame includes the second object that matches the selected second object model; and
    compare the one or more characteristics of the second object to the one or more characteristics of the first object to determine whether a difference between the one or more characteristics of the first object and the one or more characteristics of the second object exceeds a difference threshold.

15. The apparatus of claim 14, wherein the processing system is further configured to:
    recognize that the multi-component gesture is present in the sequence of image frames further in response to a determination that a difference between the one or more characteristics of the first object and the one or more characteristics of the second object does not exceed the difference threshold.

16. The apparatus of claim 15, wherein:
    the one or more characteristics of the second object include a second object size and/or a second object position; and
    to determine that the difference does not exceed the difference threshold, the processing system is further configured to:
    determine whether a difference between the first object size and the second object size does not exceed the difference threshold; and/or
    determine whether a difference between the first object position and the second object position does not exceed the difference threshold.

17. The apparatus of claim 11, wherein to analyze the at least one subsequent frame, the processing system is further configured to:
    analyze a predetermined number of frames in the sequence of image frames that are immediately subsequent to the frame; and/or
    analyze all frames in the sequence of image frames that are captured within a predetermined amount of time immediately subsequent to the frame.

18. The apparatus of claim 17, wherein the processing system is further configured to:
    determine that none of the analyzed frames includes a second object that matches the selected second object model; and
    in response to the determination that none of the analyzed frames includes a second object that matches the selected second object model, reselect the first object model as the selected object model.

19. The apparatus of claim 11, wherein the processing system is further configured to:
in response to a determination that the frame does not include the first object that matches the selected first object model, select a next frame in the sequence of image frames as the frame and repeat the analyzing of the frame to determine whether the frame includes the first object that matches the selected first object model.

20. The apparatus of claim 11, wherein to analyze the at least one subsequent frame, the processing system is further configured to:
analyze the at least one subsequent frame using hardware acceleration.

21. An apparatus configured to recognize a multi-component gesture within a sequence of image frames, the apparatus comprising:
means for selecting a first object model as a selected object model, wherein the first object model corresponds to a first component of the multi-component gesture;
means for receiving a frame in the sequence of image frames in response to the selection of the first object model as the select object model and analyzing the frame to determine whether the frame includes a first object that matches the selected first object model;
means for selecting a second object model as the selected object model, wherein the second object model corresponds to a second component of the multi-component gesture, in response to a determination that the frame includes the first object that matches the selected first object model;
means for receiving at least one subsequent frame in the sequence of image frames in response to the selection of the second object model as the selected object model and analyzing the at least one subsequent frame to determine whether the at least one subsequent frame includes a second object that matches the selected second object model; and
means for recognizing that the multi-component gesture is present in the sequence of image frames in response to a determination that the at least one subsequent frame includes the second object that matches the selected second object model.

22. The apparatus of claim 21, further comprising:
means for estimating one or more characteristics of the first object in response to the determination that the frame includes the first object that matches the selected first object model, wherein the one or more characteristics of the first object include a first object size and/or a first object position.

23. The apparatus of claim 22, further comprising:
means for identifying, based on the one or more characteristics of the first object, a portion of the at least one subsequent frame to be analyzed, wherein the identified portion is smaller than the at least one subsequent frame and corresponds to the first object size and/or the first object position;
wherein the means for receiving and analyzing the at least one subsequent frame comprises means for analyzing the identified portion of the at least one subsequent frame to determine whether the identified portion of the at least one subsequent frame includes the second object that matches the selected second object model.

24. The apparatus of claim 22, further comprising:
means for estimating one or more characteristics of the second object in response to the determination that the at least one subsequent frame includes the second object that matches the selected second object model; and
means for comparing the one or more characteristics of the second object to the one or more characteristics of the first object to determine whether a difference between the one or more characteristics of the first object and the one or more characteristics of the second object exceeds a difference threshold.

25. The apparatus of claim 21, wherein the means for analyzing the at least one subsequent frame comprises:
means for analyzing a predetermined number of frames in the sequence of image frames that are immediately subsequent to the frame; and/or
means for analyzing all frames in the sequence of image frames that are captured within a predetermined amount of time immediately subsequent to the frame.

26. A non-transitory computer-readable medium comprising code, which, when executed by a processor, causes the processor to perform operations for recognizing a multi-component gesture within a sequence of image frames, the non-transitory computer-readable medium comprising:
code for selecting a first object model as a selected object model, wherein the first object model corresponds to a first component of the multi-component gesture;
code for receiving a frame in the sequence of image frames in response to the selection of the first object model as the selected object model and analyzing the frame to determine whether the frame includes a first object that matches the selected first object model;
code for selecting a second object model as the selected object model, wherein the second object model corresponds to a second component of the multi-component gesture, in response to a determination that the frame includes the first object that matches the selected first object model;
code for receiving at least one subsequent frame in the sequence of image frames in response to the selection of the second object model as the selected object model and analyzing the at least one subsequent frame to determine whether the at least one subsequent frame includes a second object that matches the selected second object model; and
code for recognizing that the multi-component gesture is present in the sequence of image frames in response to a determination that the at least one subsequent frame includes the second object that matches the selected second object model.

27. The non-transitory computer-readable medium of claim 26, further comprising:
code for estimating one or more characteristics of the first object in response to the determination that the frame includes the first object that matches the selected first object model, wherein the one or more characteristics of the first object include a first object size and/or a first object position.

28. The non-transitory computer-readable medium of claim 26, further comprising:
code for identifying, based on the one or more characteristics of the first object, a portion of the at least one subsequent frame to be analyzed, wherein the identified portion is smaller than the at least one subsequent frame and corresponds to the first object size and/or the first object position;

wherein the code for receiving and analyzing the at least one subsequent frame comprises code for analyzing the identified portion of the at least one subsequent frame to determine whether the identified portion of the at least one subsequent frame includes the second object that matches the selected second object model.

29. The non-transitory computer-readable medium of claim 27, further comprising:
code for estimating one or more characteristics of the second object in response to the determination that the at least one subsequent frame includes the second object that matches the selected second object model; and
code for comparing the one or more characteristics of the second object to the one or more characteristics of the first object to determine whether a difference between the one or more characteristics of the first object and the one or more characteristics of the second object exceeds a difference threshold.

30. The non-transitory computer-readable medium of claim 26, wherein the code for analyzing the at least one subsequent frame comprises:
code for analyzing a predetermined number of frames in the sequence of image frames that are immediately subsequent to the frame; and/or
code for analyzing all frames in the sequence of image frames that are captured within a predetermined amount of time immediately subsequent to the frame.

* * * * *